May 3, 1927.
A. AMES, JR
1,626,591
PHOTOGRAPH AND METHOD OF MAKING THE SAME
Filed March 14 1921      2 Sheets-Sheet 1
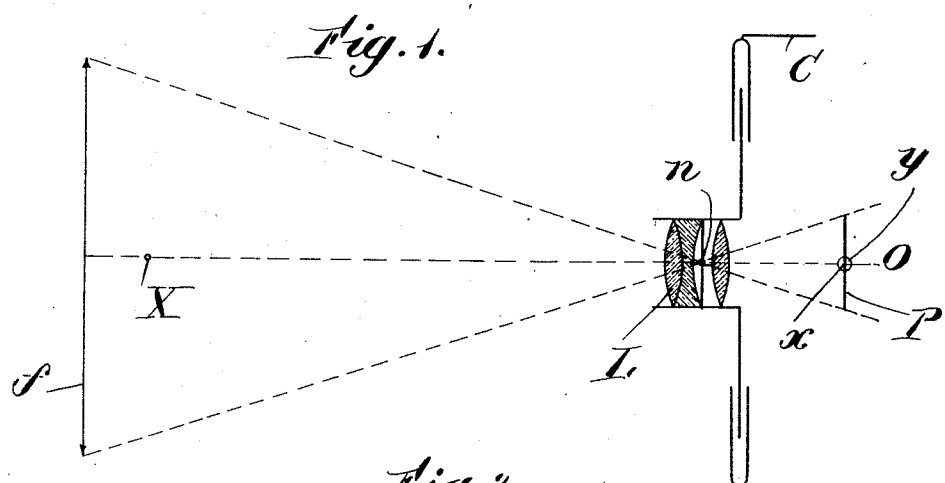
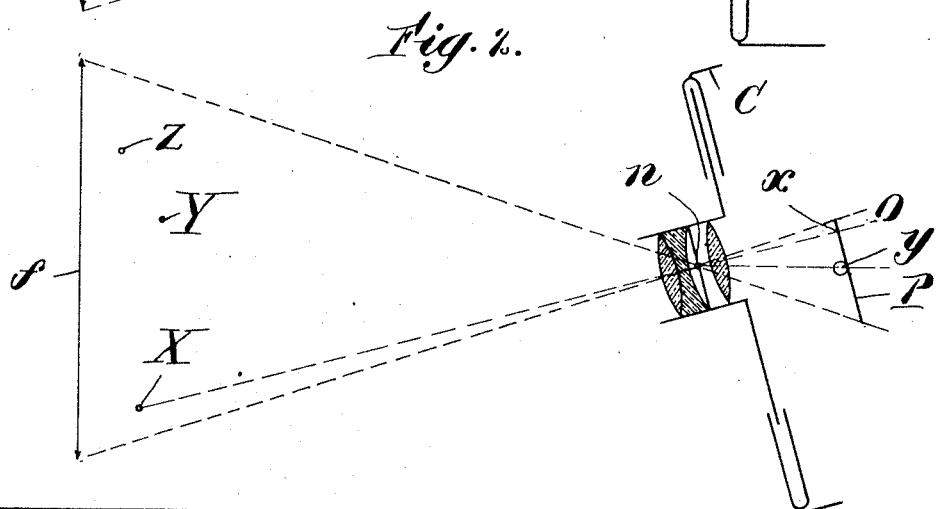
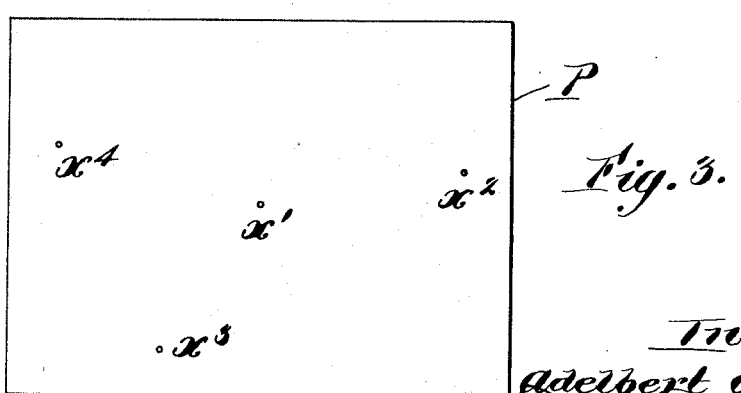
Inventor:
Adelbert Ames, Jr.
by Roberts, Roberts & Cushman
his Attys.

May 3, 1927.

A. AMES, JR 1,626,591

PHOTOGRAPH AND METHOD OF MAKING THE SAME

Filed March 14, 1921  2 Sheets-Sheet 2

Inventor
Adelbert Ames, Jr.

Patented May 3, 1927.

1,626,591

UNITED STATES PATENT OFFICE.

ADELBERT AMES, JR., OF TEWKSBURY, MASSACHUSETTS.

PHOTOGRAPH AND METHOD OF MAKING THE SAME.

Application filed March 14, 1921. Serial No. 452,274.

This invention relates to photography, and particularly relates to a photograph having therein a region of interest emphasized in respect to the remainder of the photograph by a difference of definition or rendition, and to a method of producing photographs of this type in which the center of interest in the photograph so emphasized may be caused to coincide with a natural, dramatic, or designed place of interest in the object field photographed.

Truthful and artistic portrayal of either figures or groups, landscapes, landscapes with figures, interiors, or still life (particularly, the presentation of dramatic incident in motion pictures) calls for perceptive concentration by the observer upon a part only of the field of view, to the exclusion of conscious attention to other parts. The direction of the attention of the observer has heretofore been haphazard, and dependent on the observer rather than on the picture, except when by accident or the fortuitous conditions of the object, concentration of interest has been sporadically achieved. The concentration of interest on a part of the field of view is impossible unless the appearance of the other parts of the field shall be the natural appearances of the other parts of the field of vision when attention is not directed to them.

In portrait photography some of these considerations have long been understood, and it is customary to employ for these purposes lenses of socalled "soft focus" for the purpose of eliminating detail as much as possible from the merely accessory parts of the field of view. Such lenses also eliminate detail at the center of interest.

I have described in my application Serial No. 351,011 filed January 12, 1920 [Letters Patent No. 1,482,502, dated February 5, 1924] an art of and means for photographing the object field according to its monocular appearance to human vision, the lens described in my said application being capable of producing images defined where the eye defines objects seen by it, and aberrated or diffused where the eye aberrates or diffuses its images. Photographs made by such lenses are adapted to concentrate about the optical axis and at the focal point for a certain depth of the object field only the region of good or attentive and detailed portrayal in the image and the photograph thereof.

According to my present invention I preferably employ such a lens as the instrumental means for making photographs, and this invention includes a way of utilizing such a lens, or a lens of any other type having better definition along and near its optical axis than elsewhere in its image field, for the purpose of making photographs in which the place of good definition coincides with the place of the center of interest in the object field.

While the pictures produced and the art of producing them are adapted as well to single exposures or still pictures, a large utility is found in motion-pictures of dramatic subjects, for which the present invention provides a way to lead the attention of the audience naturally to the particular character or group of characters, to the particular happenings or the particular objects in the object field upon which the dramatic interest concentrates at the moment.

The invention thus has for one principal object to provide for producing pictures in which the center of clarity or of rotundity, solidity and good definition may be selected at any place in the field of view, or shifted, in motion pictures, in imitation of the shifting attention of an observer to the events being pictured. It will be apparent that the center of interest can not always, and often does not, coincide with the axial center of the cone or pyramid comprised within the limits of the vertical and horizontal dimensions of the object field being photographed. From one point of view, this invention therefore comprises a method of and the product of shifting at will, and in response to wandering within the field of view of the center of interest, the center of good definition, of concentration, etc. in respect to the image field of the camera and the boundaries of the light-area employed to record the images.

In the accompanying drawings:

Figure 1 is a diagram section illustrating the condition when the center of interest is in the optical axis of the camera;

Fig. 2 is a similar diagram illustrating deviation of the center of interest away from the axial center of the field of view;

Fig. 3 is a diagram illustrating different places of the center of interest in respect to the field of view.

Figure 4:
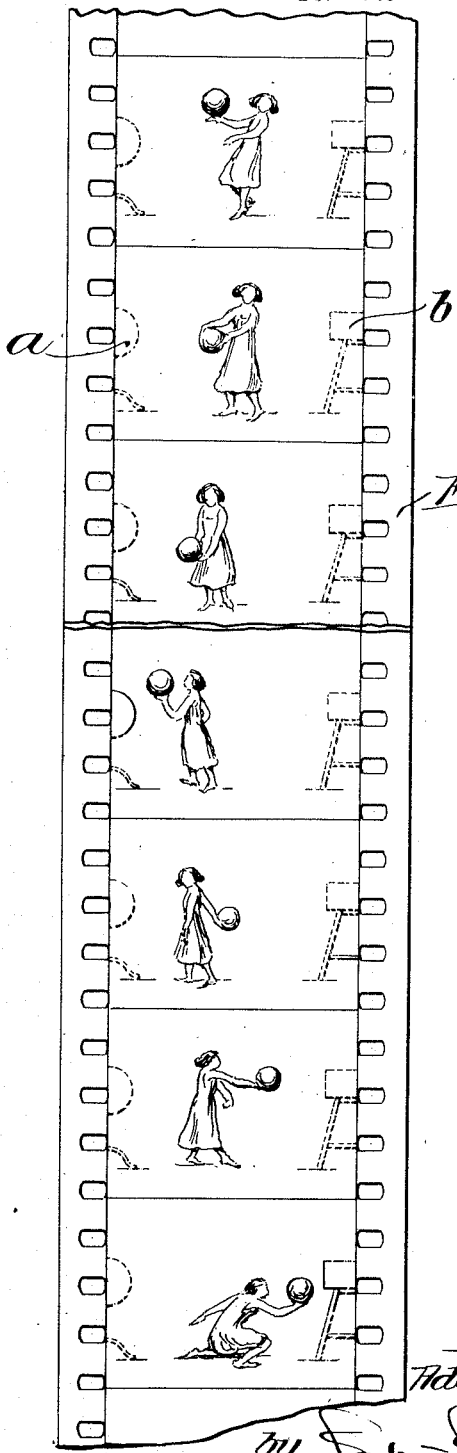
Fig. 4 is a diagram face view of a series of pictures made according to the invention.

Referring now to Figure 1, which represents either the horizontal or the vertical relations of object, camera, and image, the photographic lens L may be any desired type of lens giving better defined images along the optical axis O than at angles thereto, but preferably is a lens of the type explained in my said application. The nodal point n of the lens, for the desired conditions of operation, is on a perpendicular from the focal plane of the lens and from the sensitive surface P in said plane at the center of the region of concentration of interest. In other words, the optical axis O intersects at right angles the plate or film P at the center of interest x in the picture made on film or plate P. This is the condition, for instance, when the center of interest X in the object field represented by the quantity f, is in the center of the object field. But for dramatic representation especially, and in many other cases, the center of interest X is not in the center of the field of view f, but is displaced, see Fig. 2, away from the center of the field. In this case, if a camera C providing a mounting for the lens L and containing the sensitive surface P is turned toward the center of interest X, the field of view is no longer coincident with the prescribed field f. An accessory part of the action may be taking place, for instance, at the points Y, Z, or the object field f may be defined by scenery, properties, or a proscenium arch opening, which prevent moving the picture space represented by the surface P away from the center line X, O, of the camera C, and which prevent moving the axis O to the position shown in Fig. 2, for instance, in order to bring the good-definition spot and the displaced center of the interest X into the center of the surface P.

Bearing in mind that the intention is to cause the picture to focus the attention upon the center of interest X whatever its position within the field f, this invention provides a way of doing this without shifting the surface P out of coincidence with the dimensions of the object field f as imaged at P. If the nodal point n is fixed and the lens L is rotated about nodal point n in respect to the position of the object field f, see Fig. 2, the optical axis O may then be aimed at the center of interest X. Assuming this to take place, the surface P may now be shifted so as to bring its margins to coincidence with the margins of the image of the field within the angle subtended by the quantity f. Since it is inconvenient to move the surface P relatively to the camera in cameras as usually constructed (for instance, to move the film-gate and film of a motion picture camera) a preferred expedient is to move both the camera C and the surface P in respect to the fixed nodal point of the lens. It may therefore be provided to rotate the lens universally about its nodal point n, the camera having freedom of motion in respect to the lens in a plane perpendicular to the axis of the lens; and then to move the surface P universally in any direction in said plane. Different parts of the surface P may then be made to coincide with the axis O, the whole surface P remaining perpendicular to the axis and at a fixed distance from nodal point n. In the preferred apparatus, which I do not herein claim, this is accomplished by mounting the lens for universal rotation about the point n as a center, on a relatively fixed support, and by providing freedom of motion of the camera C in respect to the lens-mounting in a plane parallel with and equidistant from a plane at the nodal point of the lens and perpendicular to its optical axis.

The result of the relative motions is to bring the optical axis O, X, intersecting the surface P at the good-definition spot x to any desired part of the surface P corresponding to shiftings of the center of interest X upon merely aiming the lens L, preferably by motions of the camera, at the center of interest. A preferred way of doing this is to relate the direction of the lens to the position of the camera by mounting the camera C for universal motion, for instance about the vertical and horizontal axes intersecting at the point y, provision being made for increasing the distance n, y, in proportion to the value of the angle O, n, y, as by permitting the camera to move in respect to axes of its mounting crossing at y through short distances toward and away from point n.

Fig. 3 is a diagram of the surface P showing at $x^1$, $x^2$, $x^3$, $x^4$ typical positions of the center of interest attained. It is obvious that the good-definition spot may occupy any of these or any other place in the picture-space P according to the intention of the photographer.

When the lens L is the preferred lens above mentioned, the field concentric with any position of the center of interest region shows diffusions and aberrations corresponding to the chromatic aberration, astigmatism, and distributed failures of definition for other causes characteristic of monocular vision.

Pictures made according to this method direct the attention of the observer inevitably to the center of interest, and are far more natural in appearance than the customary photography in which the whole object field is displayed in sharp definition, thus leaving the effort of attentive concentration to the observer, instead of directing and producing concentration by the intention of the photographer.

While I have described one mode of controlling the position of the center of interest or attention-area, it will be understood that the invention is not limited to use of the illustratively indicated apparatus or to practice of the described steps as effected only in connection with a monocular image-former; or to monochrome photography; or to single images. Obviously the same performance of the described steps or operations in the same way is feasible and beneficial whatever number or kind of related image-formers may be simultaneously employed for such purposes as the making of composite image photographs for stereoscopic effects, or employing plural images for selective absorption for two-color or polychrome photography, or for both.

While the invention is useful for still pictures and single exposures, a principal field of use is in relation to motion pictures made by successive exposures of a film at position P, during appropriate changed positions of the axis of lens L which will have the effect of directing the attention of the audience, when displayed, successively to the interesting features of the field of view at which the axis is aimed.

For example, in Fig. 4, the dancing figure juggling a ball shown in successive pictures on the strip of film F may be made accessory to the ball by shifting the axis of the image to the successive positions of the ball, without changing the general field of view represented in this diagram by the space between the pieces of furniture at $a$ and $b$. It will be understood that it is impossible in a drawing for reproduction in a patent to indicate, as will be the case in the strip of pictures on the piece of film F, that the best definition accompanies the shifting axis, the remainder of the picture being less well defined, and the objects near the edges of the field being more aberrated than those near the spot to which attention is to be directed.

I claim:

1. The art of photography comprising forming an image of a certain object field having angular dimensions and position in space by means capable of forming an image having good definition throughout an angular magnitude less than one of said dimensions, directing the optical axis of the image forming means to the center of interest in the object-field, placing a light-sensitive surface perpendicular to said axis, with the margins of a picture space thereon subtending the angular dimensions of the image of the object-field, and thereafter maintaining these relations during successive exposures while shifting the said axis to new positions of the center of interest, the sensitive surface subtending substantially the same angle but being kept perpendicular to the said axis.

2. The art of photography comprising as steps relating the margins of the picture space on a sensitive surface to the margins of the image of an object-field, and causing the optical axis of the means employed to form the image to coincide successively with different perpendiculars to the sensitive surface intersecting the object-field at centers of interest shifting in respect to the center of said field, the image being aberrant or diffused at parts concentric with said axis and making exposures successively in the several positions of the image former.

3. The art of photography comprising forming an image of an object-field by a lens having the characteristics of monocular vision, successively directing the axis of the lens to differently placed centers of interest in an object-field of certain angular dimensions, and positioning and exposing sensitive surfaces at right angles to said axis and in marginal coincidence with the image of said object-field during each different directive position of the axis.

4. A series of successive photographs of the images of a lens having better definition in the region of its optical axis, successive photographs of said series representing the same angular dimensions of the object field having the axial region of the image in different parts of the respective photographs.

5. A motion picture film having thereon a succession of pictures of a definite field of view, the pictures being characterized by better optical definition of a center of interest in the object field, the place in the picture of the region of better optical definition varying in position from one picture to another.

Signed by me at Boston, Massachusetts, this eighth day of March, 1921.

ADELBERT AMES, Jr.